Patented Aug. 24, 1937

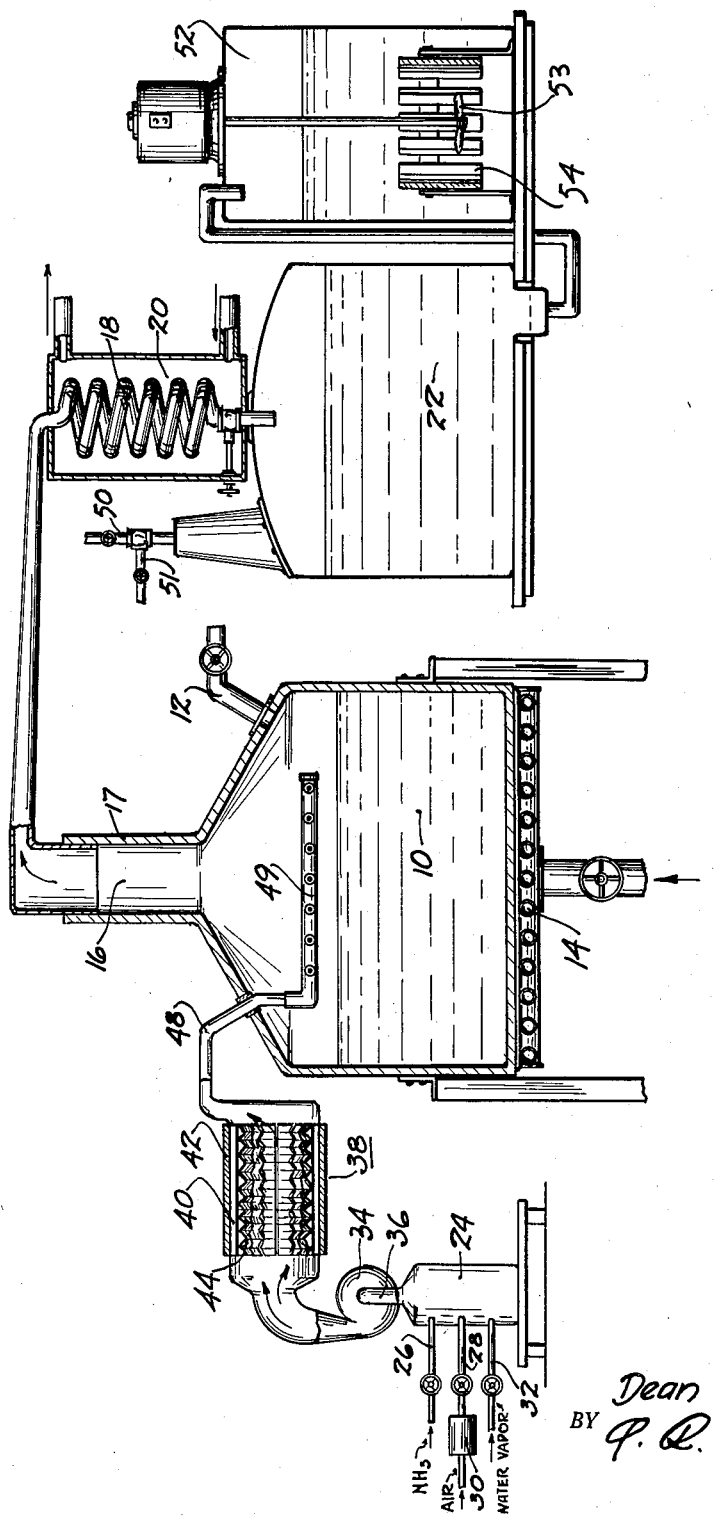

2,091,030

UNITED STATES PATENT OFFICE 2,091,030

PROCESS OF AGING DISTILLED ALCOHOLIC BEVERAGES

Dean W. Davis, Pendleton, Ind.

Application August 6, 1934, Serial No. 738,603

6 Claims. (Cl. 99—48)

This application relates to the treatment of alcoholic beverages for the purpose of improving their flavor, aroma, and palatability, and for minimizing their undesirable physiological effects.

An object of the invention is to bring about, in alcoholic beverages, in a relatively short space of time, the desirable changes usually accomplished by aging.

A further object of the invention is to improve the flavor of wines, liquors and other alcoholic beverages while decreasing the amount of fusel oil and other deleterious ingredients therein.

A further object is to provide improved apparatus for accomplishing the aforementioned objects.

Further objects and advantages of the invention will be apparent from the following description, taken in connection with the appended drawing, in which the single figure is a diagrammatic elevation with parts in section, illustrating an apparatus suitable for performing the improved method.

When alcoholic beverages, and more especially distilled liquors, are aged in the normal manner, certain very slow changes take place in the chemical composition thereof. Some of these changes are desirable, it being in fact the purpose of aging to bring them about. Thus, the flavor is improved by an increase in the percentage of esters and/or other flavoring ingredients of the liquid, and the taste of the beverage gradually diminishes in sharpness and becomes smooth and mellow.

Other concomitants of aging, however, are distinctly undesirable. Among these may be mentioned the loss by evaporation, and the increase in the relative volume of higher alcohols such as amyl, butyl, and propyl alcohols, commonly referred to in the aggregate as fusel oil.

By means of the present invention, it is possible to bring about within a short space of time most of the desirable effects of aging, without, however, the undesirable effects. These results are accomplished by subjecting the liquor to the process now to be described, preferably utilizing the apparatus disclosed herein.

Referring now to the drawing, there is shown a still 10, having an inlet pipe 12 through which is introduced the raw material, such as newly-distilled whiskey, brandy, rum, or other alcoholic spirit. The still 10 is provided with suitable heating means, such as the steam coils 14, and has an outlet chamber 16 terminating in a condensing coil 18, of any suitable construction and cooled by means of brine or other refrigerant passed through the jacket 20. The coil discharges into a suitable container 22. The still 10 and chamber 16 may be heat insulated by means of a suitable jacket 17.

A container 24, connected to chamber 16 as hereinafter described, has leading into it a conduit 26 for the introduction of anhydrous ammonia, a conduit 28 for the introduction of air from a compressor 30, and a conduit 32 for the introduction of steam or water vapor, each conduit being provided with a manually operable valve, as shown. A suitable blower or pump 34 is connected to the outlet 36 leading from the upper portion of container 24.

Pump 34 communicates with an ozone generator 38 which may be of the general type disclosed in Dean W. Davis Patent 1,864,174, and consisting of an electrically insulating cylinder 40 having on its outer surface a conducting coating 42 connected to a source of high-frequency alternating current, strips of perforated and corrugated aluminum 44 being supported upon the inner surface of the cylinder.

The gases (air and ammonia, plus some water vapor) leaving receptacle 24 pass through the ozone generator, where a portion of the oxygen of the air is converted into ozone in the known manner. The gaseous mixture then passes through a conduit 48 to a distributor 49 positioned in the still 10 above the liquid level therein. Assuming that the liquor in still 10 has been raised to a suitable temperature, the gaseous mixture meets and mingles with the alcohol and other vaporized ingredients from the still, and a reaction takes place which results in changing to some extent the characteristics of the liquor.

Like most reactions which occur in liquor aging, the precise chemical nature of this reaction is obscure and probably extremely complex. Without in any way limiting myself to any theory of what takes place, I suggest that the ozone and ammonia may unite to form hydroxylamine which acts as a catalyst upon the vaporized alcohols in the presence of nascent oxygen or ozone, causing an oxidation which reduces the quantity of fusel oil in the finished products and also promotes the formation of the esters normally developed in a period of years by normal aging. At any rate, the reaction of the vaporized liquor with ammonia and ozone produces, in the material issuing from worm 18, an improved flavor while decreasing, or at least not increasing, the fusel oil content thereof.

The excess gases from container 22 are exhausted to atmosphere through a vent 50, the condensable ingredients having been liquefied by passage through coil 18. The liquor collecting in container 22 is colorless, and is transferred, as by compressed air from a conduit 51 to a tank 52, where it is colored by agitating it, as by a rotor 53, either at normal or elevated temperature, in the presence of strips of charred wood 54, or in any other appropriate manner. This procedure is preferably continued until the liquor has taken on a color darker than that desired in the finished product, after which its color is brought back to that desired by introducing powdered activated charcoal, bone charcoal, or other bleaching agent, and agitating the mixture, preferably with free access of air in order to facilitate the elimination of any ammonia remaining in the liquid at this stage. The resulting product is superior in flavor to that obtained where the treatment in tank 52 is discontinued when the proper color is obtained.

Although the invention has been described with reference to a particular embodiment thereof, it may be varied considerably within the skill of those versed in this art. Thus, portions of the process are applicable to wines and other non-distilled alcoholic beverages, and natural aging may be employed to supplement the results obtained in the process disclosed. Instead of tank 52, the usual wooden barrels, with charred interior surfaces, may be used, and the coloring and bleaching processes may be carried out simultaneously. Although the process has been described as continuous, a batch process may be used. The process may, of course, be combined with one of the usual distillations used in producing the distilled liquor, so that no additional distillation is necessary to carry out the improved process.

I claim:

1. A process for maturing distilled alcoholic beverages, comprising reacting the volatile constituents of the beverage in vapor form with a mixture of nascent oxygen and ammonia.

2. A process for maturing distilled alcoholic beverages, comprising reacting the volatile constituents of the beverage in vapor form with a mixture of ozonized air and anhydrous ammonia.

3. A process for maturing distilled alcoholic spirits, comprising reacting the volatile constituents of the spirit in vapor form with a mixture of ozonized air and anhydrous ammonia at an elevated temperature in the presence of water vapor.

4. A process of maturing beverage alcohol, comprising ozonizing a mixture of air and ammonia gas and reacting the resulting product with the alcohol in vaporized form at an elevated temperature.

5. In a process of maturing distilled alcoholic beverages, the step which comprises treating volatile constituents of the beverage in vapor form with ozone in the presence of ammonia.

6. In a process of maturing distilled alcoholic beverages, the step which comprises treating volatile constituents of the beverage in vapor form with a gaseous mixture formed by generating ozone in the presence of ammonia.

DEAN W. DAVIS.